United States Patent
Spangler et al.

(10) Patent No.: US 10,871,074 B2
(45) Date of Patent: Dec. 22, 2020

(54) BLADE/VANE COOLING PASSAGES

(71) Applicant: UNITED TECHNOLOGIES CORPORATION, Farmington, CT (US)

(72) Inventors: Brandon W Spangler, Vernon, CT (US); David R Pack, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 107 days.

(21) Appl. No.: 16/289,341

(22) Filed: Feb. 28, 2019

(65) Prior Publication Data

US 2020/0277858 A1  Sep. 3, 2020

(51) Int. Cl.
*F01D 5/18* (2006.01)
*F01D 5/14* (2006.01)
*F01D 25/12* (2006.01)

(52) U.S. Cl.
CPC ........... *F01D 5/181* (2013.01); *F01D 5/147* (2013.01); *F01D 25/12* (2013.01); *F05D 2220/32* (2013.01); *F05D 2240/301* (2013.01); *F05D 2250/13* (2013.01); *F05D 2260/22141* (2013.01)

(58) Field of Classification Search
CPC .......... F01D 5/181; F01D 25/12; F01D 5/147; F05D 2240/301; F05D 2250/13; F05D 2220/32; F05D 2260/22141
See application file for complete search history.

(56) References Cited

U.S. PATENT DOCUMENTS

| 2,843,354 | A |   | 7/1958  | Smith |
|-----------|---|---|---------|-------|
| 4,407,632 | A |   | 10/1983 | Liang |
| 4,815,939 | A |   | 3/1989  | Doble |
| 5,165,852 | A | * | 11/1992 | Lee ........................ F01D 5/187 416/97 R |
| 5,395,212 | A | * | 3/1995  | Anzai ..................... F01D 5/187 415/115 |
| 5,403,157 | A |   | 4/1995  | Moore |
| 5,993,156 | A |   | 11/1999 | Bailly |
| 6,126,396 | A |   | 10/2000 | Doughty et al. |
| 6,206,638 | B1| * | 3/2001  | Glynn ..................... F01D 5/187 416/97 R |
| 6,213,714 | B1|   | 4/2001  | Rhodes |

(Continued)

FOREIGN PATENT DOCUMENTS

| CN | 1982655 B  | * | 6/2012 | ............ F01D 5/187 |
| EP | 2584146 A1 | * | 4/2013 | ............ F01D 5/147 |

OTHER PUBLICATIONS

USPTO, Non-Final Office Action dated Jul. 14, 2020 in U.S. Appl. No. 16/270,080.

(Continued)

*Primary Examiner* — J. Todd Newton
(74) *Attorney, Agent, or Firm* — Snell & Wilmer L.L.P.

(57) ABSTRACT

An airfoil for use with a gas turbine engine includes a pressure side wall and a suction side wall. The suction side wall is configured to be exposed to less pressure than the pressure side wall during operation of the gas turbine engine. The blade also includes a plurality of ribs forming a plurality of trapezoidal shaped cavities to receive a cooling airflow. The plurality of ribs being shaped in a way to allow for thermal growth of the airfoil, while minimizing stress in the airfoil.

15 Claims, 11 Drawing Sheets

(56) References Cited

U.S. PATENT DOCUMENTS

| | | |
|---|---|---|
| 6,290,462 B1 | 9/2001 | Ishiguro |
| 7,131,818 B2 | 11/2006 | Cunha et al. |
| 7,163,373 B2 | 1/2007 | Liang |
| 7,217,092 B2* | 5/2007 | Lee .................. F01D 5/187 416/97 R |
| 7,871,245 B2 | 1/2011 | Pietraszkiewicz et al. |
| 9,120,144 B2 | 9/2015 | Lee |
| 9,194,236 B2 | 11/2015 | Nakamata |
| 9,638,057 B2 | 5/2017 | Kwon |
| 10,036,258 B2 | 7/2018 | Mongillo |
| 10,174,621 B2 | 1/2019 | Burd |
| 10,378,364 B2* | 8/2019 | Spangler .................. F01D 5/187 |
| 2007/0031252 A1 | 2/2007 | Walters |
| 2007/0128034 A1* | 6/2007 | Lee .................. F01D 5/187 416/97 R |
| 2008/0290215 A1* | 11/2008 | Udall .................. F01D 5/147 244/123.14 |
| 2009/0269210 A1* | 10/2009 | Pietraszkiewicz ...... F01D 5/187 416/96 R |
| 2009/0274549 A1 | 11/2009 | Mitchell |
| 2010/0021308 A1 | 1/2010 | Rawlinson |
| 2013/0294891 A1 | 11/2013 | Neuhaeusler |
| 2016/0090844 A1 | 3/2016 | Auxier et al. |
| 2017/0087631 A1 | 3/2017 | Gold |
| 2017/0101871 A1 | 4/2017 | Tiedemann |
| 2017/0173685 A1 | 6/2017 | Kittleson |
| 2018/0031000 A1 | 2/2018 | Alban |
| 2018/0050392 A1 | 2/2018 | Mason-Flucke |
| 2018/0202296 A1 | 7/2018 | Kiener |
| 2018/0258779 A1 | 9/2018 | Boutaleb |
| 2018/0347379 A1* | 12/2018 | Lewis .................. F01D 5/20 |
| 2019/0003311 A1 | 1/2019 | Brittingham |
| 2019/0078446 A1 | 3/2019 | Scharl |
| 2019/0101007 A1 | 4/2019 | Propheter-Hinckley |
| 2019/0136699 A1 | 5/2019 | Spangler et al. |

OTHER PUBLICATIONS

USPTO, Corrected Notice of Allowance dated Jun. 7, 2019 in U.S. Appl. No. 15/806,224.

USPTO, Notice of Allowance dated Apr. 12, 2019 in U.S. Appl. No. 15/806,224.

* cited by examiner

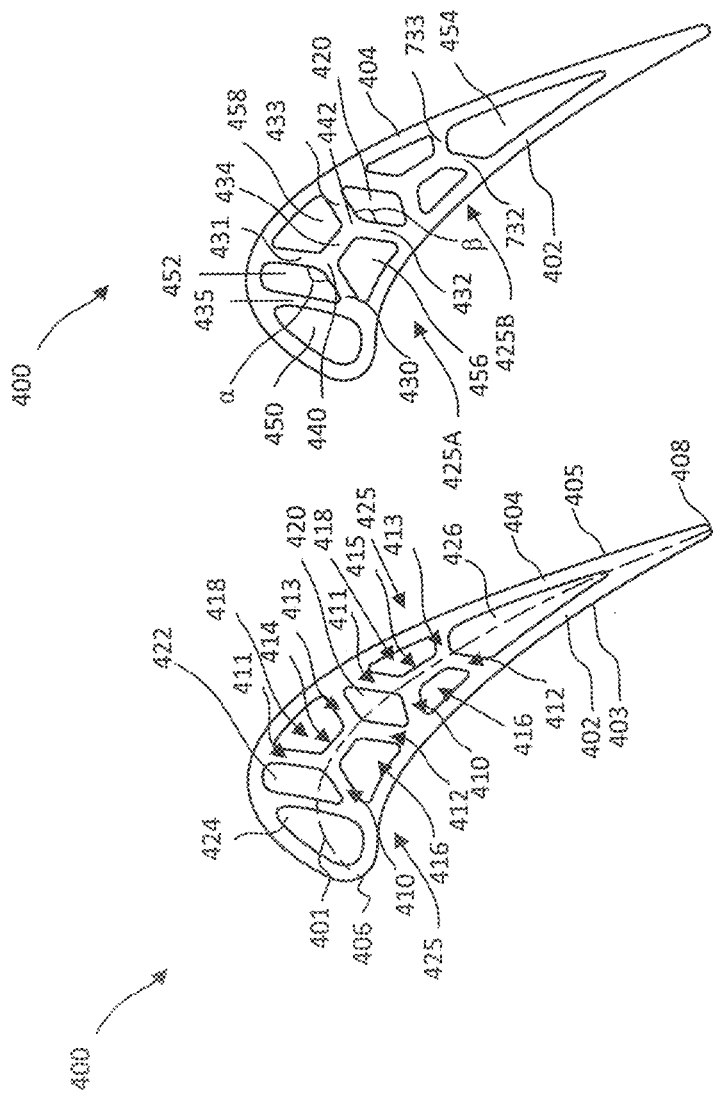

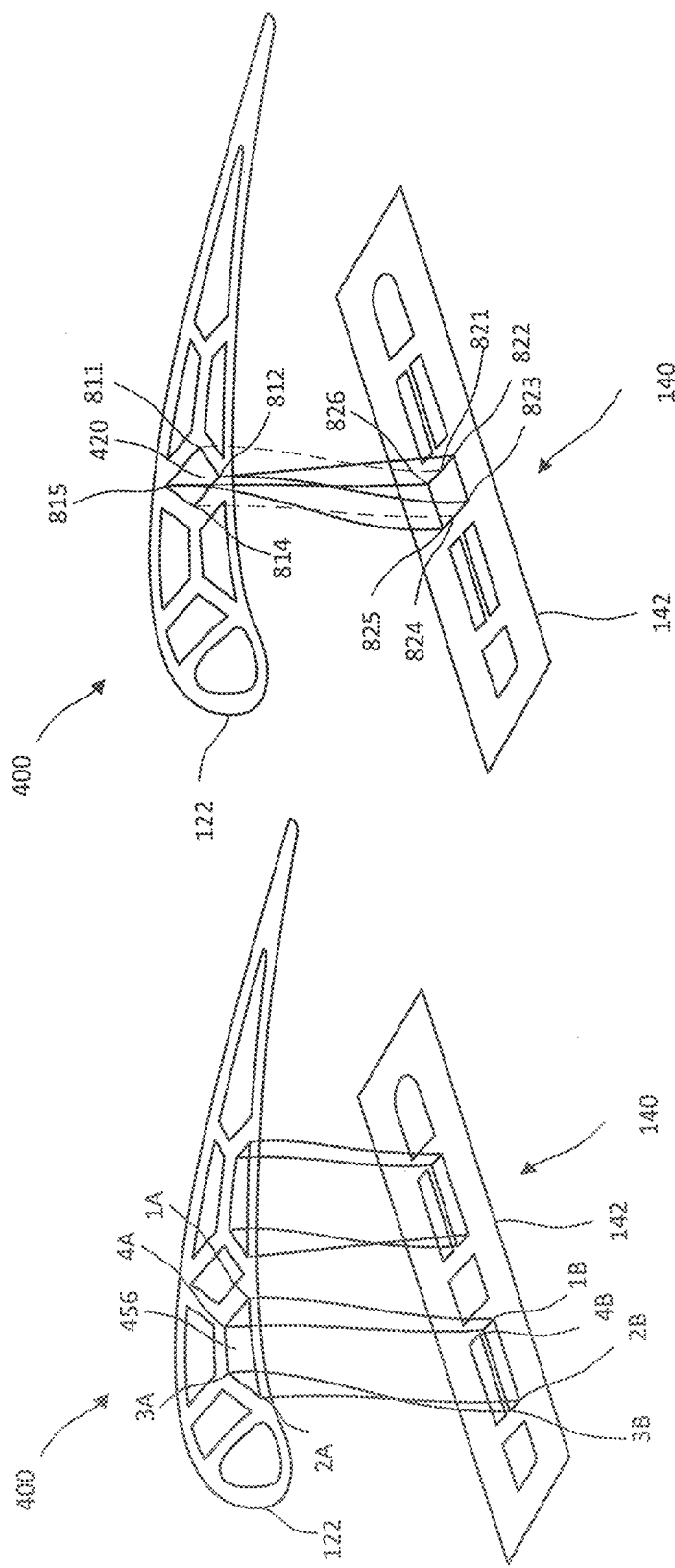

BLADE/VANE COOLING PASSAGES

FIELD

The present disclosure relates generally to airfoils for use with gas turbine engines and, more particularly, to blades and/or vanes having internal ribs that transition from an attachment cross section to an airfoil cross section with multiple cavities to provide cooling airflow to the airfoils.

BACKGROUND

Gas turbine engines typically include a compressor section, a combustor section and a turbine section. The compressor section and the turbine section each have blades including rotating blades and stationary vanes. It may be desirable to provide a cooling (or heating, in the case of the compressor section) airflow through the airfoils of blades due to the relatively high temperatures at which they are operated. In that regard, the airfoils may include outer walls along with internal ribs or walls that form internal cavities through which a cooling airflow may flow from attachments coupled to the airfoils. The internal ribs may extend radially from an attachment end of a blade to a tip of an airfoil. Because the outer walls are exposed to relatively hot air, they may experience greater thermal expansion than the internal ribs or walls. Ribs designed for an airfoil may create a flexible structure in order to account for the thermal expansion of the outer walls; however, ribs designed for an attachment may create a stiff structure in order to prevent rib and attachment crushing. Such difference in thermal expansion design of an airfoil compared to stiffness design of an attachment present various obstacles in providing an efficient cooling system for turbine blades as the airfoil ribs transition to the attachment ribs.

SUMMARY

Disclosed herein is an airfoil for use with a gas turbine engine. An airfoil may comprise a leading edge, a trailing edge, a pressure side wall, a suction side wall, and a first plurality of ribs. The first plurality of ribs may comprise a first pressure side rib, a first suction side rib, a second pressure side rib, a second suction side rib, and a first internal rib. The first pressure side rib may extend from the pressure side wall away from the leading edge. The first suction side rib may extend from the suction side wall away from the leading edge and form a first vertex with the first pressure side rib. The second pressure side rib may be disposed aft of the first pressure side rib and extend from the pressure side wall away from the trailing edge. The second suction side rib may be disposed aft of the first suction side rib and extend from the suction side wall away from the trailing edge and form a second vertex with the second pressure side rib. The first internal rib may extend from the first vertex to the second vertex.

In various embodiments, the first pressure side rib, the second pressure side rib, the first internal rib, and the pressure side wall may define a discrete quadrilateral shaped cavity in a radial airfoil cross section of the airfoil. The discrete quadrilateral shaped cavity may be trapezoidal shaped in the radial airfoil cross section. The airfoil may further comprise a second plurality of ribs. The second plurality of ribs may comprise a third pressure side rib, a third suction side rib, a fourth pressure side rib, a fourth suction side rib, and a second internal rib. The third pressure side rib may be disposed aft of the second pressure side rib and extend from the pressure side wall away from the leading edge. The third suction side rib may be disposed aft of the second suction side rib and extend from the suction side wall away from the leading edge and form a third vertex with the third pressure side rib. The fourth pressure side rib may be disposed aft of the third pressure side rib and extend from the pressure side wall away from the trailing edge. The fourth suction side rib may be disposed aft of the third suction side rib and extend from the suction side wall away from the trailing edge and form a fourth vertex with the fourth pressure side rib. The second internal rib may extend from the third vertex to the fourth vertex. The second pressure side rib, the second suction side rib, the third pressure side rib, and the third suction side rib may form a quadrilateral shaped cavity in a radial airfoil cross section of the airfoil. The second pressure side rib, the second suction side rib, the third pressure side rib, the third suction side rib, the pressure side wall, and the suction side wall may form a hexagonal shaped cavity in a radial airfoil cross section of the airfoil.

Disclosed herein is a blade for use with a gas turbine engine. The blade may comprise an attachment and an airfoil. The attachment may have a radial attachment plane. The airfoil may be disposed radially outward from the attachment. The airfoil may comprise a leading edge, a trailing edge, a pressure side wall, a suction side wall, and a first plurality of ribs. The first plurality of ribs may comprise a first pressure side rib, a first suction side rib, a second pressure side rib, a second suction side rib, and a first internal rib. The first pressure side rib may extend from the pressure side wall away from the leading edge. The first suction side rib may extend from the suction side wall away from the leading edge and form a first vertex with the first pressure side rib. The second pressure side rib may be disposed aft of the first pressure side rib and extend from the pressure side wall away from the trailing edge. The second suction side rib may be disposed aft of the first suction side rib and extend from the suction side wall away from the trailing edge and form a second vertex with the second pressure side rib. The first internal rib may extend from the first vertex to the second vertex.

The airfoil may further comprise a second plurality of ribs. The second plurality of ribs may comprise a third pressure side rib, a third suction side rib, a fourth pressure side rib, a fourth suction side rib, and a second internal rib. The third pressure side rib may be disposed aft of the second pressure side rib and extend from the pressure side wall away from the leading edge. The third suction side rib may be disposed aft of the second suction side rib and extend from the suction side wall away from the leading edge and form a third vertex with the third pressure side rib. The fourth pressure side rib may be disposed aft of the third pressure side rib and extend from the pressure side wall away from the trailing edge. The fourth suction side rib may be disposed aft of the third suction side rib and extend from the suction side wall away from the trailing edge and form a fourth vertex with the fourth pressure side rib. The second internal rib may extend from the third vertex to the fourth vertex. The first pressure side rib, the second pressure side rib, the first internal rib, and the pressure side wall may define a discrete quadrilateral shaped cavity in a radial airfoil cross section of the airfoil. The discrete quadrilateral shaped cavity may be trapezoidal shaped in the radial airfoil cross section. The second pressure side rib, the second suction side rib, the third pressure side rib, and the third suction side rib may form a quadrilateral shaped cavity in a radial airfoil cross section of the airfoil. The second pressure side rib, the second suction side rib, the third pressure side rib, the third suction side rib, the pressure side wall, and the suction side wall may form a hexagonal shaped cavity in a radial airfoil cross section of the airfoil. The third pressure side rib and third suction side rib may form a second angle that increases to near 180 degrees as the third pressure side rib and third suction side rib transition from a radial airfoil plane to the radial attachment plane. A first end of the second pressure side rib and a first end of the third pressure side rib may intersect in a radial airfoil plane and separate as the second pressure side rib and the third pressure side rib transition from the radial airfoil plane to the radial attachment plane.

Disclosed herein is a gas turbine engine. The gas turbine engine may comprise a turbine rotor. The turbine rotor may comprise a blade. The blade may comprise an attachment and an airfoil. The attachment may have a radial attachment plane. The airfoil may be disposed radially outward from the attachment. The airfoil may comprise a leading edge, a trailing edge, a pressure side wall, a suction side wall, and a first plurality of ribs. The first plurality of ribs may comprise a first pressure side rib, a first suction side rib, a second pressure side rib, a second suction side rib, and a first internal rib. The first pressure side rib may extend from the pressure side wall away from the leading edge. The first suction side rib may extend from the suction side wall away from the leading edge and form a first vertex with the first pressure side rib. The second pressure side rib may be disposed aft of the first pressure side rib and extend from the pressure side wall away from the trailing edge. The second suction side rib may be disposed aft of the first suction side rib and extend from the suction side wall away from the trailing edge and form a second vertex with the second pressure side rib. The first internal rib may extend from the first vertex to the second vertex.

The airfoil may further comprise a second plurality of ribs. The second plurality of ribs may comprise a third pressure side rib, a third suction side rib, a fourth pressure side rib, a fourth suction side rib, and a second internal rib. The third pressure side rib may be disposed aft of the second pressure side rib and extend from the pressure side wall away from the leading edge. The third suction side rib may be disposed aft of the second suction side rib and extend from the suction side wall away from the leading edge and form a third vertex with the third pressure side rib. The fourth pressure side rib may be disposed aft of the third pressure side rib and extend from the pressure side wall away from the trailing edge. The fourth suction side rib may be disposed aft of the third suction side rib and extend from the suction side wall away from the trailing edge and form a fourth vertex with the fourth pressure side rib. The second internal rib may extend from the third vertex to the fourth vertex. The first pressure side rib, the second pressure side rib, the first internal rib, and the pressure side wall may define a discrete quadrilateral shaped cavity in a radial airfoil cross section of the airfoil. The second pressure side rib, the second suction side rib, the third pressure side rib, and the third suction side rib may form a hexagonal shaped cavity in the radial airfoil cross section. The first pressure side rib and the first internal rib may form a first angle. The first angle may transition from an obtuse angle in a radial airfoil plane to a nearly right angle in the radial attachment plane.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

FIGS. 4A and 4B illustrate an airfoil radial cross section of an airfoil, in accordance with various embodiments;

FIGS. 8A, 8B, and 8C illustrate an orthogonal view of a plurality of cavities extending from a radial attachment plane to a radial airfoil cross section of a blade, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized, and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B." Moreover, any reference to "substantially," means plus or minus 10 degrees.

Figure 1:
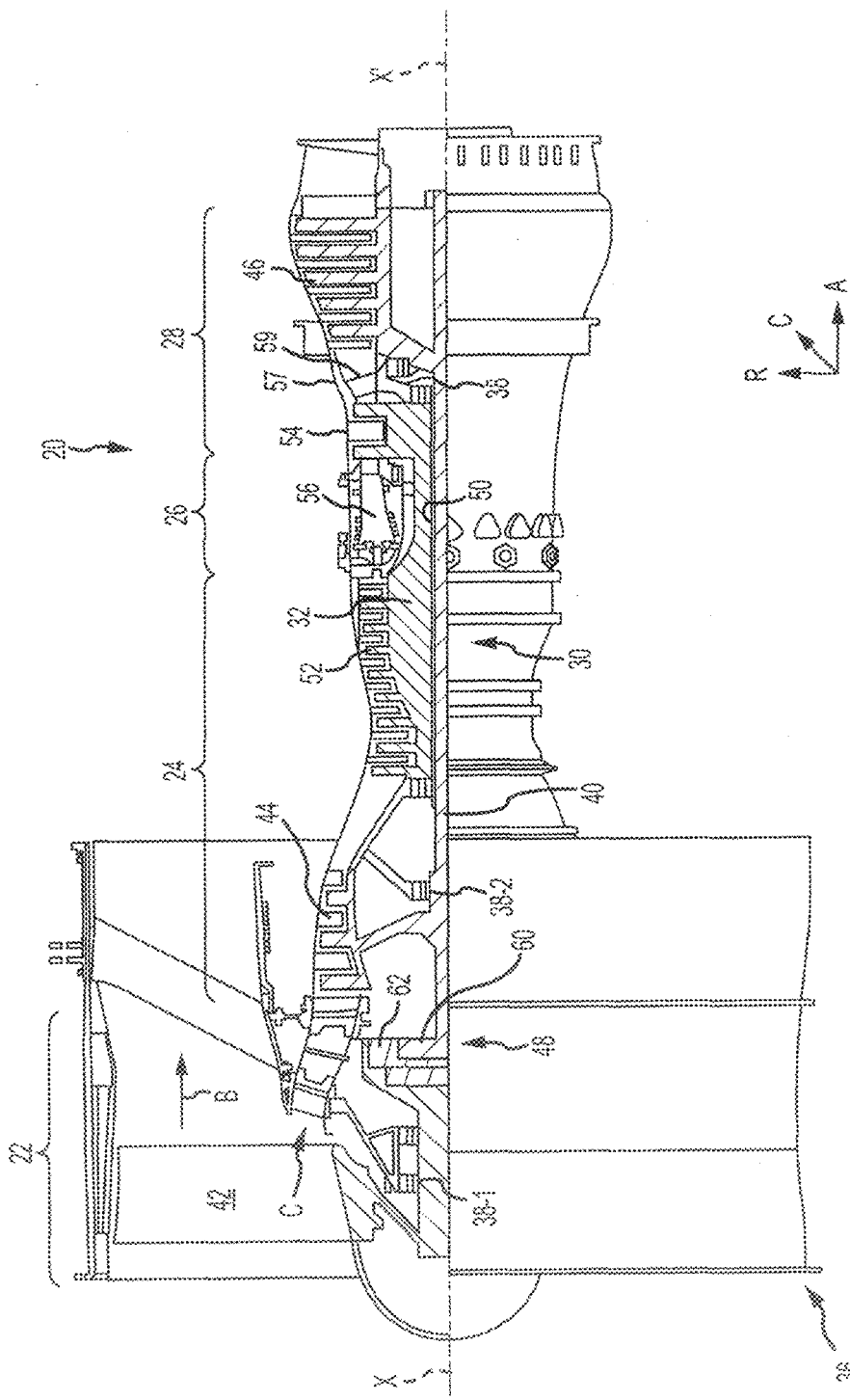
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high-speed spool 32 includes an outer shaft 50 that interconnects a high pressure (or second) compressor section 52 and the high pressure (or first) turbine section 54. A combustor 56 is located between the high-pressure compressor 52 and the high pressure turbine 54. A mid-turbine frame 57 of the engine static structure 36 is located generally between the high-pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low-pressure compressor section 44 then the high-pressure compressor 52, mixed and burned with fuel in the combustor 56, then expanded over the high-pressure turbine 54 and the low pressure turbine 46. The mid-turbine frame 57 includes airfoils 59 which are in the core airflow path. The turbines 46, 54 rotationally drive the respective low speed spool 30 and high-speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low-pressure turbine 46 may have a pressure ratio that is greater than about five (5). The diameter of the fan 42 may be significantly larger than that of the low-pressure compressor section 44, and the low-pressure turbine 46 may have a pressure ratio that is greater than about five (5:1). The pressure ratio of the low-pressure turbine 46 is measured prior to an inlet of the low-pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high-pressure compressor 52 than are conventionally experienced. These higher operating temperatures and pressure ratios create operating environments that cause thermal loads that are higher than the thermal loads conventionally experienced, which may shorten the operational life of current components.

Figure 2:
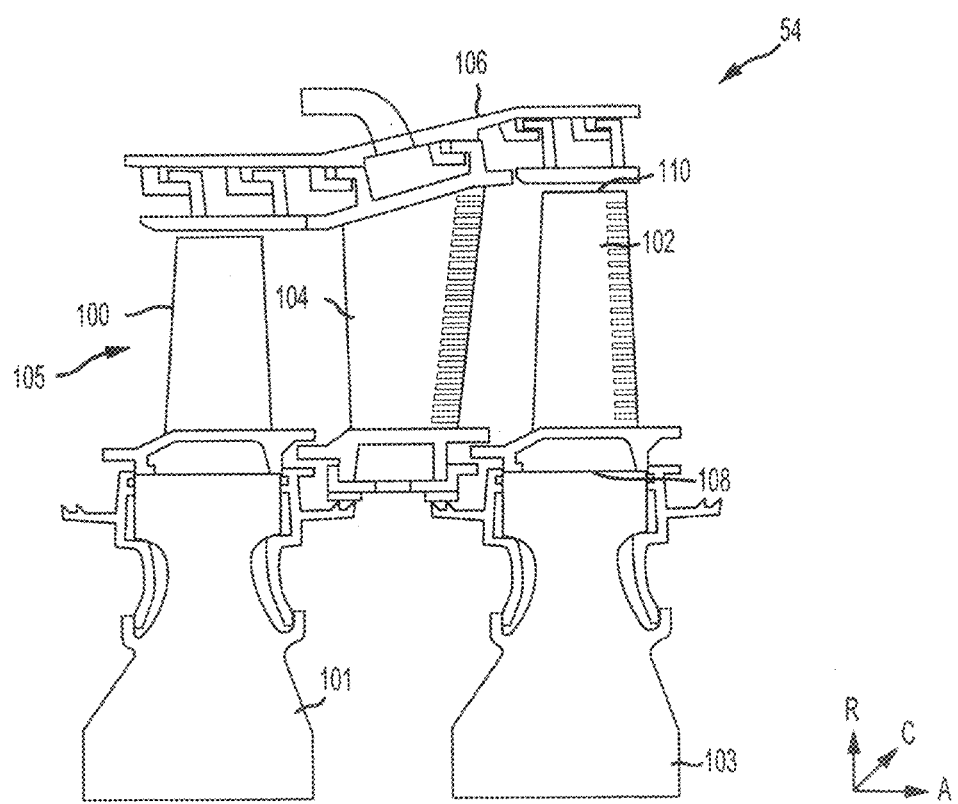
FIG. 2 is a cross-sectional view of a portion of a high pressure turbine section of the gas turbine engine of FIG. 1, in accordance with various embodiments.

Referring now to FIGS. 1 and 2, the high-pressure turbine section 54 may include multiple blades 105 including multiple rows, or stages, of blades including a first blade 100 and a second blade 102, along with rows, or stages, of vanes located therebetween including a vane 104. The blades 100, 102 may be coupled to disks 101, 103 respectively which facilitate rotation of the blades 100, 102 about the axis X-X'. The vane 104 may be coupled to a case 106 and may remain stationary relative to the axis X-X'.

The blade 102 may include an inner diameter edge 108 and an outer diameter edge 110. Due to relatively high temperatures within the high-pressure turbine section 54, it may be desirable for the blade 102 (and the vane 104) to receive a flow of cooling air. In that regard, the blade 102 may receive a cooling airflow from the inner diameter edge 108 or the outer diameter edge 110. The blade 102 may define cavities that transport the cooling airflow through the blade 102 to the other of the inner diameter edge 108 or the outer diameter edge 110.

Improved cooling passages will be described throughout the disclosure with reference to the blade 102. However, one skilled in the art will realize that the cooling passage design implemented in the blade 102 may likewise be implemented in the vane 104, or any airfoil (including a rotating blade or stationary vane) in any portion of the compressor section 24 or the turbine section 28.

Figure 3:
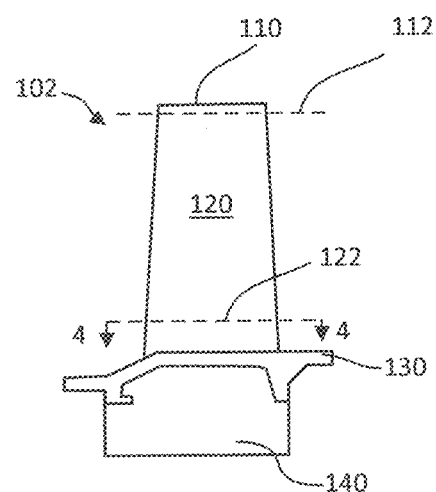
FIG. 3 is a cross-sectional view of a portion of a high pressure turbine section of the gas turbine engine of FIG. 1, in accordance with various embodiments.

Referring now to FIG. 3, a side view of a blade 102, in accordance with various embodiments, is illustrated. The blade 102 may comprise an airfoil 120 extending radially outward from a platform 130, and an attachment 140 extending radially inward from the platform 130. A radial airfoil plane 122 is defined by the cross section 4-4 taken proximate the inner diameter of airfoil 120. Referring back to FIG. 2, the attachment 140 may be coupled to disk 101.

Referring now to FIGS. 4A and 4B, an airfoil cross sectional geometry 400 of radial airfoil plane 122, in accordance with various embodiments, is illustrated. The airfoil 120 may include a pressure side wall 402 and a suction side wall 404. The pressure side wall 402 may receive a hot airflow from the combustor section 26 of the gas turbine engine 20 of FIG. 1. In that regard, the pressure side wall 402 may be exposed to greater pressure than the suction side wall 404 during operation of the gas turbine engine 20 of FIG. 1. The hot airflow may cause the blade 102 to rotate about the A axis.

The airfoil 120 may also include a leading edge 406 and a trailing edge 408. The leading edge 406 may be located axially forward of the trailing edge 408 and may receive the hot airflow prior to the trailing edge 408. The airfoil may also include a mean camber line 401 that represents the curved line that plots the midpoint between the pressure surface 403 and suction surface 405.

The airfoil 120 may include a plurality of cavities (416, 418, 420, 422, 424, and 426). The plurality of cavities (416, 418, 420, 422, 424, and 426) may all be discrete airflow passages. In various embodiments, cavities (422, 424) may have a single air source, and the remaining plurality of cavities (416, 418, 420, and 426) may all have discrete airflow. The airfoil may further define a plurality of internal airfoil ribs 425 having sets of airfoil ribs (410, 411, 412, 413, and 414) that may define a plurality of cavities (416, 418) and an internal cavity 420. The plurality of cavities (416, 418) may receive a cooling airflow to reduce a temperature of the blade 102. The airfoil 120 may include a first set of pressure side ribs 410 extending from the pressure side wall 402, away from the leading edge 406, and oriented in a first direction. A first set of suction side ribs 411 may extend from the suction side wall 404, away from the leading edge 406, and be oriented in a second direction. As shown in FIG. 4B, a first pressure side rib 430 from the first set of pressure side ribs 410 may form a first vertex 440 with a first suction side rib 431 from the first set of suction side ribs 411. The first vertex 440 may create an angle α between the first pressure side rib 430 and the first suction side rib 431. In various embodiments, the angle α may be between 100 degrees and 170 degrees. Furthermore, the angle α may be between 120 degrees and 150 degrees. The first vertex 440 may be at, or near the mean camber line 401. By having a first vertex 440 less than 180 degrees, the first pressure side rib 430 and the first suction side rib 431 provide flexibility for the hot pressure side wall 402 and hot suction side wall 404 to expand, minimizing thermal stresses.

In various embodiments, a forward rib 435 may extend from the intersection of the first pressure side rib 430 and the pressure side wall 402 in a substantially parallel direction to the first suction side rib 431 to the suction side wall 404. The forward rib 435 may separate a forward leading-edge cavity 450 and an aft leading edge cavity 452, both of which are disposed forward of pressure side cavity 456 and suction side cavity 458.

The airfoil 120 may include a second set of pressure side ribs 412 extending from the pressure side wall 402, away from the trailing edge 408, and oriented in a third direction. A second set of suction side ribs 413 may extend from the suction side wall 404, away from the trailing edge 408, and be oriented in a fourth direction. As shown in FIG. 4B, a second pressure side rib 432 from the second set of pressure side ribs 412 may form a second vertex 442 with a second suction side rib 433 from the second set of suction side ribs 413. The second vertex 442 may create an angle β between the second pressure side rib 432 and the second suction side rib 433. In various embodiments, the angle β may be between 100 degrees and 170 degrees. Furthermore, the angle β may be between 120 degrees and 150 degrees. The second vertex 442 may be at, or near, the mean camber line 401. The second vertex 442 may be aft of the first vertex 440. By having a second vertex 442 less than 180 degrees, the second pressure side rib 432 and the second suction side rib 433 provide flexibility for the hot pressure side wall 402 and hot suction side wall 404 to expand, minimizing thermal stresses.

The airfoil 120 may include a set of internal ribs 414 that may be disposed between the pressure side wall 402 and the suction side wall 404. The set of internal ribs 414 may extend in a fifth direction. The fifth direction may be substantially parallel to a tangent line from the mean camber line 401, and the tangent line be generated from point on the mean camber line 401 that is near a midpoint of a rib from the internal set of ribs 414. In various embodiments, the set of internal ribs 414 may follow the curvature of the mean camber line 401. As shown in FIG. 4B, a camber rib 434 from the set of internal ribs 414 may extend from the first vertex 440 to the second vertex 442. In various embodiments, the camber rib 434 may be substantially linear. In various embodiments, the camber rib may be curved.

As shown in FIG. 4B, ribs (430, 431, 432, 433, and 434) may form a first plurality of internal airfoil ribs 425A. A second plurality of internal airfoil ribs 425B may be disposed aft of the first plurality of internal airfoil ribs 425A. Disposed between a portion of the first plurality of internal airfoil ribs 425A and the second plurality of internal airfoil ribs 425B may be internal cavity 420. In various embodiments, the internal cavity 420 may be a quadrilateral shaped internal cavity. In various embodiments, the internal cavity 420 may have a hexagonal shaped cross section.

Referring now to FIG. 4A, the plurality of cavities (416, 418) and internal cavity 420 may be oriented in such a way as to segregate the cooling flows into different regions. For example, the set of pressure side cavities 416 may transport a pressure side cooling airflow, and the set of suction side cavities 418 may transport a suction side cooling airflow. Likewise, and with brief reference to FIGS. 2, 4A, and 4B, the internal cavity 420 may be bordered by ribs only instead of the pressure side wall 402 or the suction side wall 404, the cooling airflow traveling through the internal cavity 420 remains relatively cool. In that regard, the internal cavity 420 may provide relatively cool air to the inner diameter edge 108 and/or the outer diameter edge 110 of the blade.

Referring to FIG. 4B, the first pressure side rib 430, the second pressure side rib 432, the camber rib 434, and the pressure side wall 402 may define a pressure side cavity 456 from the set of pressure side cavities 416. In various embodiments, the pressure side cavity 456 may be quadrilateral shaped. In various embodiments, the pressure side cavity 456 may be trapezoidal shaped. Similarly, the first suction side rib 431, the second suction side rib 433, the camber rib 434, and the suction side wall 404 may define a suction side cavity 458. In various embodiments, the suction side cavity 458 may be quadrilateral shaped. In various embodiments, the suction side cavity may be trapezoidal shaped. In various embodiments, the fourth pressure side rib 732 and the fourth suction side rib 733 of the second plurality of ribs 425B may define a trailing edge cavity 454 with the pressure side wall 402 and the suction side wall 404. The length of camber rib 434 may be tailored to meet the desired number of pressure side cavities 416 or suction side cavities 418 and individual cavity areas such as pressure side cavity 456 and suction side cavity 458.

Turning to FIGS. 4A, 4B, 5A, and 5B, the plurality of airfoil ribs 425 are oriented in such a manner as to facilitate expansion of the pressure side wall 402 and the suction side wall 404 that occurs as the airfoil 120 is exposed to hot exhaust from the combustor section 26 of FIG. 1. In particular, the structure formed by the first plurality of airfoil ribs 425A and the second plurality of ribs 425B facilitates such expansion. Because the pressure side ribs (430, 432) and camber rib 434 are internal to the airfoil 120, they are exposed to less heat than the pressure side wall 402. In that regard, the pressure side wall 402 may experience greater thermal expansion than the pressure side ribs (430, 432) and the camber rib 434.

Figures 5A, 5B:
FIGS. 5A and 5B illustrate interaction of a pressure side cavity created by the plurality of ribs of the airfoil of FIGS. 4A and 4B, along with changes in internal cavity shapes, due to thermal expansion of the pressure side wall, in accordance with various embodiments.

The structure formed by the plurality of airfoil ribs 425 facilitates this thermal expansion of the pressure side wall 402 with relatively little tensile and compressive stress between the plurality of airfoil ribs 425, the pressure side wall 402 and the suction side wall 404. As shown in FIG. 5A and in response to the airfoil 120 being exposed to relatively cool air, the camber rib 434 may define a first camber distance 534 and the pressure side wall 402 may define a first outside wall distance 502. Additionally, there may be a first cavity distance 500 between pressure side wall 402 and camber rib 434. In various embodiments, the first camber distance 534 may be less than first outside wall distance 502.

In FIG. 5B, when the airfoil 120 is exposed to relatively hot air, the camber rib 434 may define a second camber distance 536, the pressure side wall 402 may define a second outside wall distance 506, and a second cavity distance 501 may be defined by the distance between the pressure side wall 402 and camber rib 434. In various embodiments, relatively hot air may be between 2500 F and 3800 F. Due to the exposure to the hot airflow, the pressure side wall 402 may experience relatively large thermal expansion. In that regard, second outside wall distance 506 of the pressure side wall 402, in response to being in a relatively hot state, may be significantly greater than the first outside wall distance 502. However, because the camber rib 434 is not exposed to the hot airflow, the difference between the first outside wall distance 502 and the second outside wall distance 506 is more than the difference between the first camber distance 534 and the second camber distance 536. The arrangement of the plurality of airfoil ribs 425 facilitates this disparity in distance by allowing the cavity to compress in the circumferential direction such that the second cavity distance 501 is less than the first cavity distance 500.

Figures 6A, 6B:
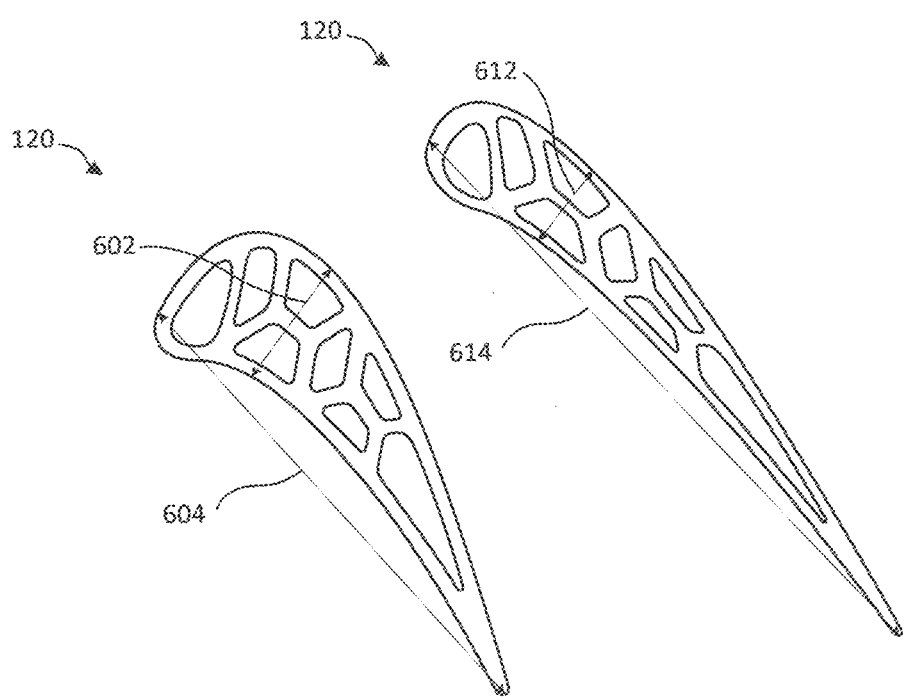
FIGS. 6A and 6B illustrate interaction of the plurality of ribs of the airfoil of FIGS. 4A and 4B, along with changes in internal cavity shapes, due to thermal expansion of the pressure side wall, in accordance with various embodiments.

Referring now to FIG. 6A, the airfoil 120 in a relatively cool state is depicted. In a cool state, the airfoil may have a first max camber distance 602 and a first chord distance 604. As shown in FIG. 6B, when the airfoil is exposed to relatively hot air, the airfoil 120 may compress, and result in a second max camber distance 612 and a second chord distance 614. The first max camber distance 602 may be greater than the second max camber distance 612. Whereas, the second chord distance 614 may be greater than the first chord distance 604. This configuration of cavities may permit a reduced number of discrete cooling cavities in an airfoil, while limiting the stresses in the airfoil due to thermal growth.

Figure 7A:
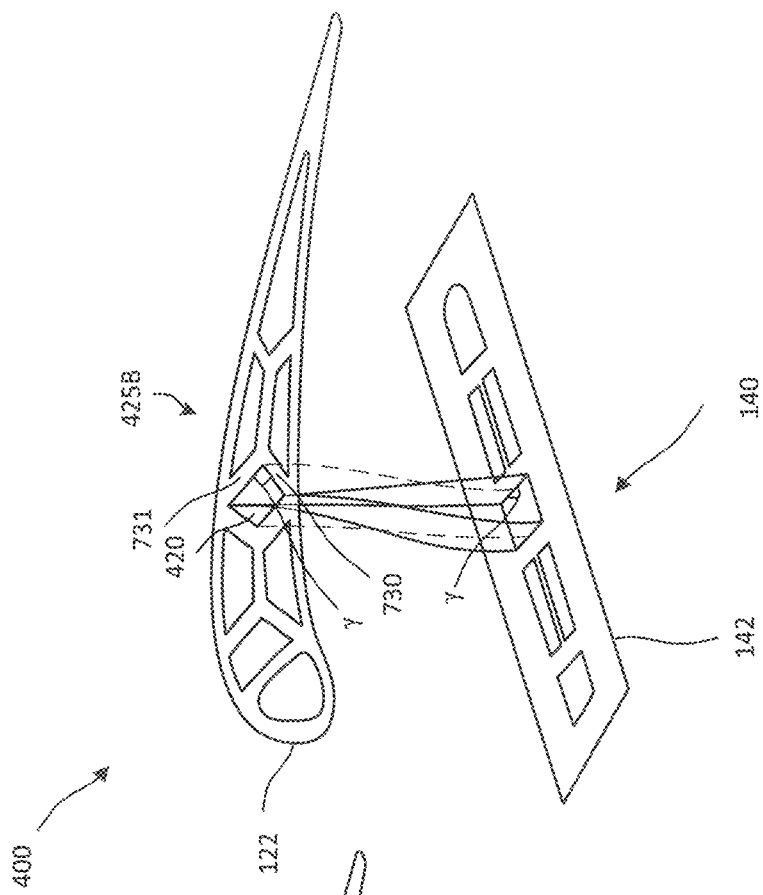
FIGS. 7A and 7B illustrate an orthogonal view of a plurality of cavities extending from a radial attachment plane to a radial airfoil cross section of a blade, in accordance with various embodiments.
Figure 7B:
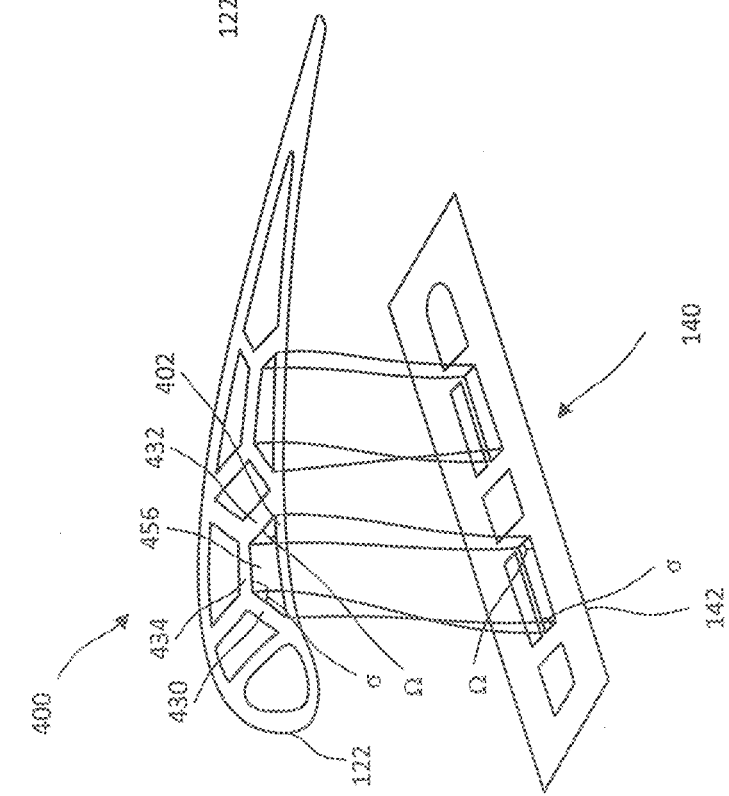

Referring to FIGS. 7A and 7B, a radial cavity transitioning from a radial airfoil plane 122 to a radial attachment plane 142 of the attachment 140 is shown in accordance with various embodiments. Referring now to FIG. 7A, in airfoil cross sectional geometry 400, first pressure side rib 430 and camber rib 434 define an angle σ. The angle σ may be obtuse and may be between 110 degrees and 150 degrees. As shown, the angle σ decreases as pressure side cavity 456 transitions from radial airfoil plane 122 to radial attachment plane 142. In various embodiments, the angle σ decreases from between about 150 degrees in radial airfoil plane 122 to about 90 degrees in radial attachment plane 142. In contrast, the angle Ω, defined by second pressure side rib 432 and pressure side wall 402 in the airfoil cross sectional geometry 400, may be acute and may be between 30 degrees and 70 degrees. The angle Ω may increase as pressure side cavity 456 transitions from radial airfoil plane 122 to radial attachment plane 142. Angle Ω may increase from about 30 degrees in radial airfoil plane 122 to about 90 degrees in radial attachment plane 142.

Referring now to FIG. 7B, in airfoil cross sectional geometry 400, third pressure side rib 730 and third suction side rib 731 from the second plurality of ribs 425B define a rib angle γ. The angle γ may be between 60 degrees and 140 degrees in airfoil cross sectional geometry 400. The angle γ may increase as internal cavity 420 transitions from radial airfoil plane 122 to radial attachment plane 142. In various embodiments, the angle γ may increase from about 60 degrees in radial airfoil plane 122 to about 180 degrees in radial attachment plane 142.

Referring now to FIG. 8A, the transition from the pressure side cavity 456 in the airfoil cross sectional geometry 400 to radial attachment plane 142 may be further defined by pressure cavity control points (1A, 2A, 3A, 4A) and attachment control points (1B, 2B, 3B, 4B). As shown, transitioning from four control points to four control points makes a very smooth transition for the pressure cavity. Airfoil control points (1A, 2A, 3A) may transition from an acute angle in airfoil cross sectional geometry 400 to a near right angle at attachment control points (1B, 2B, 3B) in radial attachment plane 142. Airfoil control points (2A, 3A, 4A) may transition from an obtuse angle in airfoil cross sectional geometry 400 to a near right angle at attachment control points (2B, 3B, 4B) in radial attachment plane 142. Airfoil control points (3A, 4A, 1A) may transition from an obtuse angle in airfoil cross sectional geometry 400 to a near right angle at attachment control points (3B, 4B, 1B) in radial attachment plane 142. Airfoil control points (4A, 1A, 2A) may transition from an acute angle in airfoil cross sectional geometry 400 to a near right angle at attachment control points (4B, 1B, 2B) in radial attachment plane 142. Although referred to pressure side cavity 456, the control points described in this section may to apply to the set of pressure side cavities 416 and the set of suction side cavities 418.

Referring now to FIG. 8B, the transition from the internal cavity 420 in the airfoil cross sectional geometry 400 to radial attachment plane 142 may be further defined by internal cavity control points (811, 812, 814, 815) and internal attachment control points (821, 822, 823, 824, 825, 826). As shown, control point 812 may transition from a vertex in airfoil cross sectional geometry 400 to a near linear line between control points 822 and 823 in radial attachment plane 142. Similarly, control point 815 may transition from a vertex to a near linear line between control points 825 and 826. In various embodiments, airfoil control points (815, 811, 812) may transition from an angle in airfoil cross sectional geometry 400 to attachment control points (826, 821, 822) forming a near linear line in radial attachment plane 142. Similarly, airfoil control points (812, 814, 815) may transition from an angle in airfoil cross sectional geometry to attachment control points (823, 824, 825) forming a near linear line in radial attachment plane 142.

Figure 8C:
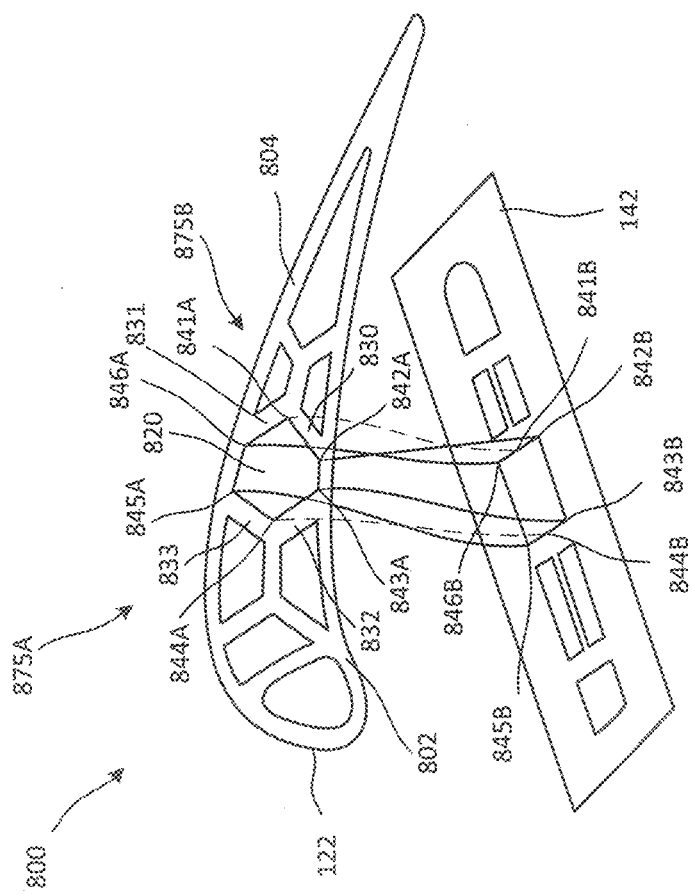

Referring now to FIG. 8C, a further embodiment of a transition from an airfoil cross sectional geometry 800 having an internal cavity 820 is depicted. In various embodiments a first plurality of ribs 875A and a second plurality of ribs 875B may be spaced along the pressure side wall 802 and suction side wall 804 of an airfoil. An aft pressure side rib 832 and an aft suction side rib 833 from the first plurality of ribs 875A, along with a forward pressure side rib 830 and a forward suction side rib 831 from the second plurality of ribs 875B, along with the pressure side wall 802 and suction side wall 804 may define an internal cavity 820. By having internal cavity 820 exposed to pressure side wall 802 and suction side wall 804, a more uniform temperature distribution through the plurality of ribs (875A, 875B) may be achieved. In various embodiments, the transition from the internal cavity 820 in the airfoil cross sectional geometry 800 to radial attachment plane 142 may be further defined by internal cavity control points (841A, 842A, 843A, 844A, 845A, 846A) and internal attachment control points (841B, 842B, 843B, 844B, 845B, 846B).

As shown, transitioning from six control points to six control points makes a very smooth transition for internal cavity 820. Airfoil control points (841A, 842A, 843A) may transition from an obtuse angle in airfoil cross sectional geometry 800 to a near right angle at attachment control points (841B, 842B, 843B) in radial attachment plane 142. Airfoil control points (842A, 843A, 844A) may transition from an obtuse angle in airfoil cross sectional geometry 800 to a near right angle at attachment control points (842B, 843B, 844B) in radial attachment plane 142. Airfoil control points (843A, 844A, 845A) may transition from an angle in airfoil cross sectional geometry 800 to a near linear line at attachment control points (843B, 844B, 845B) in radial attachment plane 142. Airfoil control points (844A, 845A, 846A) may transition from an obtuse angle in airfoil cross sectional geometry 800 to a near right angle at attachment control points (844B, 845B, 846B) in radial attachment plane 142. Airfoil control points (845A, 846A, 841A) may transition from an obtuse angle in airfoil cross sectional geometry 800 to a near right angle at attachment control points (845B, 846B, 841B) in radial attachment plane 142. Airfoil control points (846A, 841A, 842A) may transition from an angle in airfoil cross sectional geometry 800 to a near linear line at attachment control points (846B, 841B, 842B) in radial attachment plane 142. This configuration of control points for internal cavity 820 allows for a smooth transition to the attachment end and allows for better structural loading in the attachment.

Figure 9A:
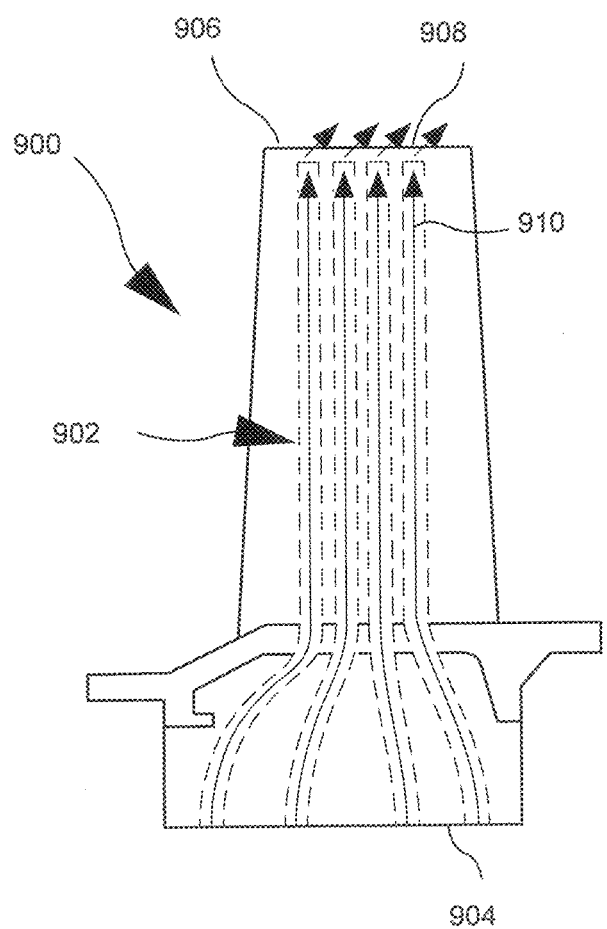
FIGS. 9A and 9B are cross-sectional views of various blades having transitional ribs from an attachment to an airfoil of a blade with various additional cooling features, in accordance with various embodiments.
Figure 9B:
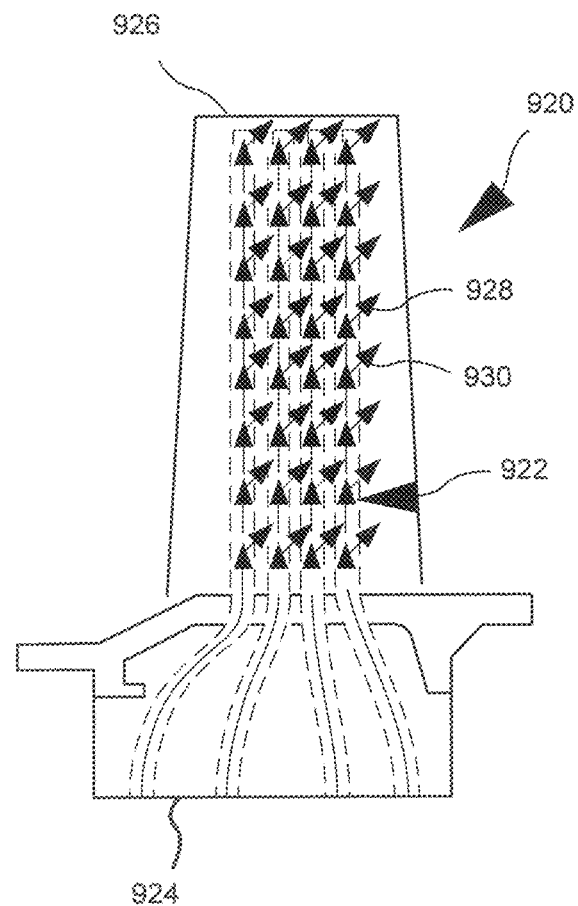

Referring now to FIGS. 4A, 9A, and 9B various blades 900, 920 may have ribs having a structure that defines cavities that are oriented in a similar manner as the ribs (410, 411, 412, 413, 414, and 435) and cavities (450, 452, 454, 416, 418, and 420) of the blade 102. The various blades 900 and 920 may further include additional cooling features.

Referring now to FIG. 9A, the blade 900 may include radial cavities 902. The radial cavities 902 may receive air from an inner diameter edge 904. The air may flow radially outward through the radial cavities 902 and exit through tip holes 908 on an outer diameter edge 906 as shown by arrows 910. Referring now to FIGS. 7A, 7B, and 9A, the radial cavities 902 may comprise discrete cavities (416, 418, 420, 422, 424, 426) extending radially outward and exiting through tip holes 908. The radial cavities 902 may further transition from the radial attachment plane 142 in the attachment 140 as depicted in FIGS. 7A and 7B.

Referring to FIG. 9B, the blade 920 may include radial cavities 922 along with film holes 928. In that regard, the radial cavities 922 may receive air from an inner diameter edge 924. The air may flow radially outward through the radial cavities. The film holes 928 may be located along at least one of a pressure side wall or a suction side wall of the blade 920. In that regard, air from the radial cavities 922 exits the radial cavities 922 via the film holes 928 as it travels from the inner diameter edge towards an outer diameter edge 926 as shown by arrows 930.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil, comprising:
   a leading edge;
   a trailing edge;
   a pressure side wall;
   a suction side wall;
   a first plurality of ribs, comprising:
      a first pressure side rib extending from the pressure side wall away from the leading edge;
      a first suction side rib extending from the suction side wall away from the leading edge and forming a first vertex with the first pressure side rib;

a second pressure side rib aft of the first pressure side rib and extending from the pressure side wall away from the trailing edge;
a second suction side rib disposed aft of the first suction side rib and extending from the suction side wall away from the trailing edge and forming a second vertex with the second pressure side rib; and
a first internal rib extending from the first vertex to the second vertex; and
a second plurality of ribs, the second plurality of ribs comprising:
a third pressure side rib disposed aft of the second pressure side rib and extending from the pressure side wall away from the leading edge;
a third suction side rib disposed aft of the second suction side rib and extending from the suction side wall away from the leading edge and forming a third vertex with the third pressure side rib;
a fourth pressure side rib disposed aft of the third pressure side rib and extending from the pressure side wall away from the trailing edge;
a fourth suction side rib disposed aft of the third suction side rib and extending from the suction side wall away from the trailing edge and forming a fourth vertex with the fourth pressure side rib; and
a second internal rib extending from the third vertex to the fourth vertex, wherein the second pressure side rib, the second suction side rib, the third pressure side rib, the third suction side rib, the pressure side wall, and the suction side wall form a hexagonal shaped cavity in a radial airfoil cross section of the airfoil.

2. The airfoil of claim 1, wherein the first pressure side rib, the second pressure side rib, the first internal rib, and the pressure side wall define a discrete quadrilateral shaped cavity in the radial airfoil cross section of the airfoil.

3. The airfoil of claim 2, wherein the discrete quadrilateral shaped cavity is trapezoidal shaped in the radial airfoil cross section.

4. A blade, comprising:
an attachment having a radial attachment plane;
an airfoil disposed radially outward from the attachment, the airfoil comprising:
a leading edge;
a trailing edge;
a pressure side wall;
a suction side wall;
a first plurality of ribs, comprising:
a first pressure side rib extending from the pressure side wall away from the leading edge;
a first suction side rib extending from the suction side wall away from the leading edge and forming a first vertex with the first pressure side rib;
a second pressure side rib aft of the first pressure side rib and extending from the pressure side wall away from the trailing edge;
a second suction side rib disposed aft of the first suction side rib and extending from the suction side wall away from the trailing edge and forming a second vertex with the second pressure side rib; and
a first internal rib extending from the first vertex to the second vertex; and
a second plurality of ribs, the second plurality of ribs comprising:
a third pressure side rib disposed aft of the second pressure side rib and extending from the pressure side wall away from the leading edge;
a third suction side rib disposed aft of the second suction side rib and extending from the suction side wall away from the leading edge and forming a third vertex with the third pressure side rib;
a fourth pressure side rib disposed aft of the third pressure side rib and extending from the pressure side wall away from the trailing edge;
a fourth suction side rib disposed aft of the third suction side rib and extending from the suction side wall away from the trailing edge and forming a fourth vertex with the fourth pressure side rib; and
a second internal rib extending from the third vertex to the fourth vertex, wherein a first end of the second pressure side rib and a first end of the third pressure side rib intersect in a radial airfoil plane and separate as the second pressure side rib and the third pressure side rib transition from the radial airfoil plane to the radial attachment plane.

5. The blade of claim 4, wherein the first pressure side rib, the second pressure side rib, the first internal rib, and the pressure side wall define a discrete quadrilateral shaped cavity in a radial airfoil cross section of the airfoil.

6. The blade of claim 5, wherein the discrete quadrilateral shaped cavity is trapezoidal shaped in the radial airfoil cross section.

7. The blade of claim 4, wherein the second pressure side rib, the second suction side rib, the third pressure side rib, and the third suction side rib form a quadrilateral shaped cavity in a radial airfoil cross section of the airfoil.

8. The blade of claim 4, wherein the second pressure side rib, the second suction side rib, the third pressure side rib, the third suction side rib, the pressure side wall, and the suction side wall form a hexagonal shaped cavity in a radial airfoil cross section of the airfoil.

9. The blade of claim 4, wherein the first pressure side rib and the first internal rib form a first angle, wherein the first angle transitions from an obtuse angle in the radial airfoil plane to a right angle in the radial attachment plane.

10. The blade of claim 4, wherein the third pressure side rib and third suction side rib form a second angle that increases to 180 degrees as the third pressure side rib and the third suction side rib transition from the radial airfoil plane to the radial attachment plane.

11. A gas turbine engine, comprising:
a turbine rotor comprising:
a blade comprising:
an attachment having a radial attachment plane;
an airfoil disposed radially outward from the attachment, the airfoil comprising:
a leading edge;
a trailing edge;
a pressure side wall;
a suction side wall;
a first plurality of ribs, comprising:
a first pressure side rib extending from the pressure side wall away from the leading edge;
a first suction side rib extending from the suction side wall away from the leading edge and forming a first vertex with the first pressure side rib;
a second pressure side rib aft of the first pressure side rib and extending from the pressure side wall away from the trailing edge;

a second suction side rib disposed aft of the first suction side rib and extending from the suction side wall away from the trailing edge and forming a second vertex with the second pressure side rib; and a first internal rib extending from the first vertex to the second vertex, wherein the first pressure side rib and the first internal rib form a first angle, wherein the first angle transitions from an obtuse angle in a radial airfoil plane to a right angle in the radial attachment plane.

12. The gas turbine engine of claim 11, wherein the airfoil further comprises a second plurality of ribs, the second plurality of ribs comprising:

a third pressure side rib disposed aft of the second pressure side rib and extending from the pressure side wall away from the leading edge;

a third suction side rib disposed aft of the second suction side rib and extending from the suction side wall away from the leading edge and forming a third vertex with the third pressure side rib;

a fourth pressure side rib disposed aft of the third pressure side rib and extending from the pressure side wall away from the trailing edge;

a fourth suction side rib disposed aft of the third suction side rib and extending from the suction side wall away from the trailing edge and forming a fourth vertex with the fourth pressure side rib; and a second internal rib extending from the third vertex to the fourth vertex.

13. The gas turbine engine of claim 11, wherein the first pressure side rib, the second pressure side rib, the first internal rib, and the pressure side wall define a discrete quadrilateral shaped cavity in a radial airfoil cross section of the airfoil.

14. The gas turbine engine of claim 12, wherein the second pressure side rib, the second suction side rib, the third pressure side rib, and the third suction side rib form a hexagonal shaped cavity in a radial airfoil cross section of the airfoil.

15. A blade, comprising:

an attachment having a radial attachment plane;

an airfoil disposed radially outward from the attachment, the airfoil comprising:

a leading edge;

a trailing edge;

a pressure side wall;

a suction side wall;

a first plurality of ribs, comprising:

a first pressure side rib extending from the pressure side wall away from the leading edge;

a first suction side rib extending from the suction side wall away from the leading edge and forming a first vertex with the first pressure side rib;

a second pressure side rib aft of the first pressure side rib and extending from the pressure side wall away from the trailing edge;

a second suction side rib disposed aft of the first suction side rib and extending from the suction side wall away from the trailing edge and forming a second vertex with the second pressure side rib; and a first internal rib extending from the first vertex to the second vertex; and a second plurality of ribs, the second plurality of ribs comprising:

a third pressure side rib disposed aft of the second pressure side rib and extending from the pressure side wall away from the leading edge;

a third suction side rib disposed aft of the second suction side rib and extending from the suction side wall away from the leading edge and forming a third vertex with the third pressure side rib;

a fourth pressure side rib disposed aft of the third pressure side rib and extending from the pressure side wall away from the trailing edge;

a fourth suction side rib disposed aft of the third suction side rib and extending from the suction side wall away from the trailing edge and forming a fourth vertex with the fourth pressure side rib; and a second internal rib extending from the third vertex to the fourth vertex, wherein the third pressure side rib and third suction side rib form a second angle that increases to 180 degrees as the third pressure side rib and the third suction side rib transition from the radial airfoil plane to the radial attachment plane.

* * * * *